United States Patent [19]

Yang

[11] Patent Number: 4,760,999

[45] Date of Patent: Aug. 2, 1988

[54] CLAMPING DEVICE

[76] Inventor: Tai-Her Yang, 5-1 Taipin Street, Si-Hu Town, Dzan-Hwa, Taiwan, Taiwan

[21] Appl. No.: 943,773

[22] Filed: Dec. 19, 1986

[51] Int. Cl.[4] .......... B23Q 3/02

[52] U.S. Cl. .......... 269/241

[58] Field of Search .......... 269/241, 246, 247

[56] References Cited

U.S. PATENT DOCUMENTS

| | | | |
|---|---|---|---|
| 584,872 | 6/1897 | Harrison | 269/241 |
| 4,221,369 | 9/1980 | Takusugi | 269/250 |

*Primary Examiner*—Robert C. Watson

*Attorney, Agent, or Firm*—Leonard Bloom

[57] ABSTRACT

A clamping device which includes a fixed member, a movable member and a threaded shaft passing through the members for pressing an object therebetween. A pressing head having external threads which are finer than the threads of the shaft is placed on the threaded shaft. A pressing cap having internal threads complementary to the threads of the pressing head surrounds the head. This cap provides stronger pressing power upon the object being clamped after the threaded shaft has been moved. A relatively small bolt head formation is formed on the threaded shaft and a relatively large fitting is formed on the pressing head. A handle is provided having a relatively small socket formed therein for being removably received on the relatively small bolt formation providing torque therefore, and a relatively large socket formed therein for being removably received on the relatively large fitting providing torque therefore.

2 Claims, 4 Drawing Sheets

CLAMPING DEVICE

BACKGROUND OF THE INVENTION

A traditional pressing equipment such as a vise or a squeezing out equipment or other equipment that transforms turning torque into the pressing power through a threaded turning is under the restraint of the following two restraints:

(1) With the use of a finely threaded shaft under the same driving torque, a stronger pressing power can be gain, but with a slower driving speed.

(2) With the use of a coarsely threaded shaft, driving speed may be gained, but under the same driving torque, it gains less pressing power.

To meet the demand of the frequent loading and unloading operation, usually only a moderately threaded groove selection is allowed. This application has a design that on the first driving threaded handle which is a part of a pressing equipment, that is a head with a larger diameter used to produce the pressing power, the second threaded cap with shorter groove distance is attached. By driving this threaded cap, it may produce a latent doubling action power. The sliding part of a pressing equipment is driven toward the pressing position by the first driving threaded handle with high speed at first, then by turning the second threaded cap, the stronger pressing power is produced.

SUMMARY OF THE INVENTION

The main design is that on the first driving threaded handle which is a part of a pressing equipment that is a head with a larger diameter used to produce the pressing power, the second threaded grooves with shorter grooves distance is made. A threaded cap which can be driven is set on it.

After the pressing equipment is driven to the tightly pressing position by the first driving threaded shaft, then by driving the threaded cap on the second threaded grooves with a shorter distances, the stronger pressure may be produced.

BRIEF DESCRIPTION OF THE DRIVING

FIG. 1. A general clamping equipment principle diagram 1.

FIG. 2. A general clamping equipment principle diagram 2.

FIG. 3. An implementation example that this design is applied to the FIG. 1 model structure.

FIG. 4. An implementation example that this design is applied to the FIG. 2 model structure.

FIG. 5A. The first implementation example of this design having independent hand wheels.

FIG. 5B. The second implementation example of this design having independent hand wheels.

FIG. 5C is a side elevation of the embodiment shown in FIG. 5B

FIG. 6. An implementation example of this design that has a single sided sharing handle.

FIG. 7. An example applied to a vise.

FIG. 8. An example applied to the paralleled clamp.

FIG. 9. An example applied to the hand holding plier.

FIG. 10. An example applied to squeezing out equipment.

DETAILED DESCRIPTION OF THE INVENTION

Figure 1:
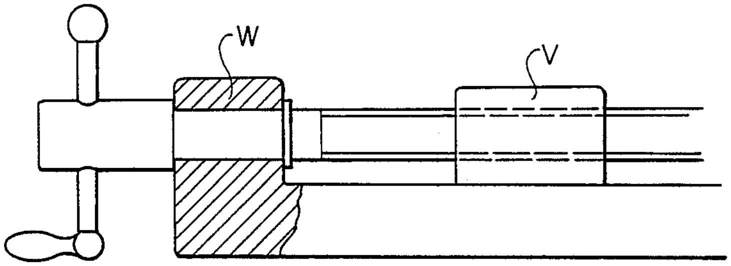
Figure 2:
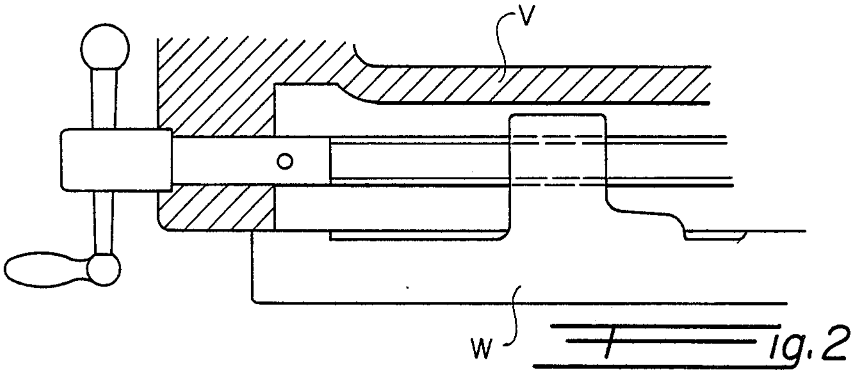

A traditional structure applying a threaded shaft to produce the pressing power is widely used on many utensils, such as a driving movement structure of a vise, jack, squeezing out machine, etc. Most commonly used is shown in the FIG. 1 and FIG. 2. By driving a leading shaft that is snapped in a piercing opening in the fixed body W, it drives a moving body V, which has a threaded hole, back and forth. But in a practical application, it is inevitable to be restrained by the following two conditions:

(1) If a finely threaded shaft is selected, under the same driving torque, a stronger pressing power can be gained, but with a slower driving speed.

(2) If a threaded shaft with coarse threaded grooves is selected, the driving speed may be gained, but under the same driving torque, it gains less pressing power.

The main design is that on the larger diameter end of a driving handle that creates pressing power, the fine threaded grooves is made. A threaded cap which can be driven is set on it.

After the moveable pressing structure is driven to a tight position, then by turning this threaded cap, it may produce a stronger pressing power.

Figure 3:
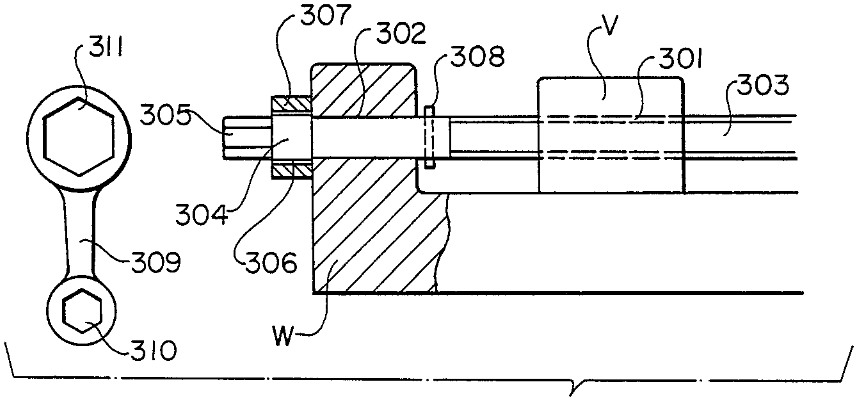

The FIG. 3 is one of its practical examples. In the Figure, W is a fixed body. On it, a piercing opening 302 is made for a leading shaft to pass through and it does not obstruct its free turning. The opening diameter is smaller than the pressing head 304 of a leading shaft. V is a moving body. Inside it, there is a threaded hole 301, which is used to snap the first threaded section 303 of a leading shaft.

303 is the first threaded section of a leading threaded shaft, after it passes through a piercing opening 302 of the fixed body W, it is snapped in a threaded hole 301 of a moving body V. 304 is a pressing head of a threaded shaft. When a threaded shaft drives a moveable body V to close up toward a fixed body W, and pressing tightly on the clipping side of a fixed body W. A leading shaft produces a pulling power for a moveable body. A pin 308 (a spring pin or other block may replace it) may drive and push a moveable body V to loosen when a leading shaft turns in counter-wise direction.

A proper space is retained between a pin and a fixed body W allowing to move when a threaded shaft presses a threaded cap tightly.

305 is a snapping multiple-sided head of a leading shaft that may fit a smaller socket 310 of a driving handle 309. It makes a turning drive. There is the second fine threaded grooves 306 on the leading shaft pressing head 304, for turning tight the threaded cap 307 to produce the stronger pressing power.

The pressing threaded cap 307 is fitted for a larger socket 311 of a driving handle 309.

It can be turned to produce the stronger pressing power after the moveable body is driven to the pressing tight position.

Figure 4:
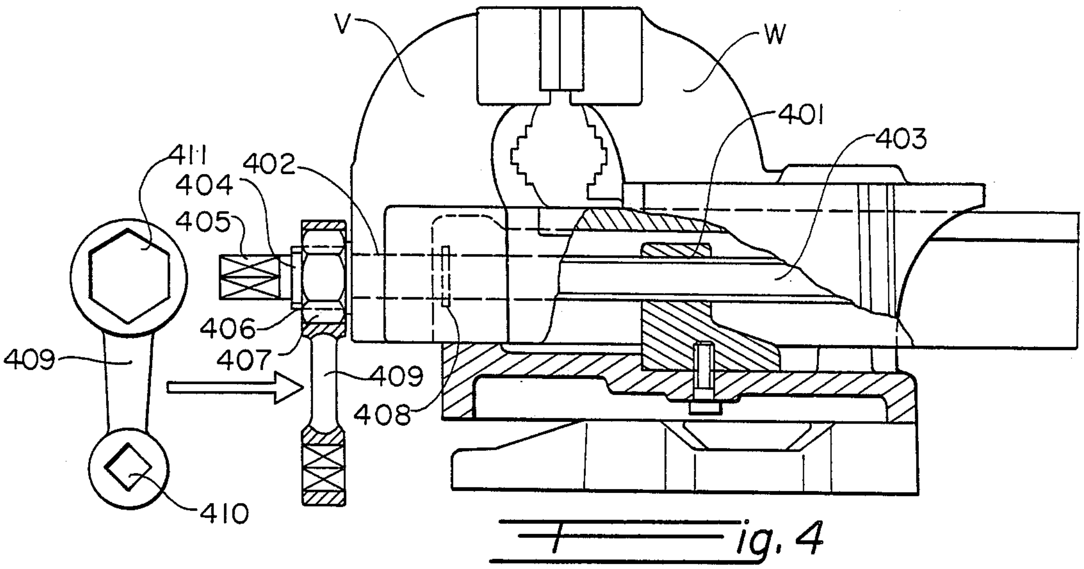

With reference to FIG. 4, the pressing apparatus includes a fixed member W, a movable member V, a threaded shaft 403 passing through the fixed and movable members for moving the movable member V with respect to the fixed member W for pressing an object between the fixed and movable members. A handle 409 is provided for turning the threaded shaft 403.

A pressing head 404 has an outer diameter greater than the diameter of the threaded portion of the threaded shaft and is located on the threaded shaft 403.

The pressing head has external threads which are finer threads than the threads of the threaded shaft 403.

A pressing cap 407 has internal threads complementary with the external threads of the pressing head 404 for engaging the head threads whereby the pressing cap 407 is capable of exerting stronger pressing power upon the object between the fixed and movable members after the threaded shaft 403 has moved the movable member V so that the object is pressed between the fixed and movable members. One end of the threaded shaft 403 includes a relatively small socket 405 for receiving one end 410 of the handle 409.

The outer surface of the pressing cap 407 includes a fitting for a relatively large socket 411 on the handle 409 capable of being turned to exert the stronger pressing power after the threaded shaft 403 has moved the movable member V so that the object is pressed between the fixed and movable members.

In FIG. 4, the movable member V includes a nonthreaded opening 402 through which a portion of the threaded shaft 403 passes, and in which the threaded shaft turns freely.

The fixed member W includes a threaded hole 401 whose threads engage the threads of the threaded shaft.

By turning the threaded shaft 403 in a predetermined tightening direction, e.g. clockwise, the threaded shaft forces the movable member V toward the fixed member W until the movable member V presses the object between the movable and fixed members. One end of the threaded shaft 403 includes a relatively small socket 405 for receiving one end 410 of a two-ended handle 409.

The outer surface of the pressing cap 407 includes a fitting for a relatively large socket 411 located on the other end of the handle 409. The large socket is capable of being turned to exert the stronger pressing power after the threaded shaft has moved the movable member V to press the object between the fixed and movable members.

In FIG. 4, a loosening pin 408 is provided for moving the movable member V away from the fixed member W when the threaded shaft 403 is turned in a predetermined loosening direction, e.g. counterclockwise. The pin 408 is spaced from the fixed member W thereby permitting the loosening pin to move when the threaded shaft 403 is tightly pressing the pressing cap 407.

Figure 5A:
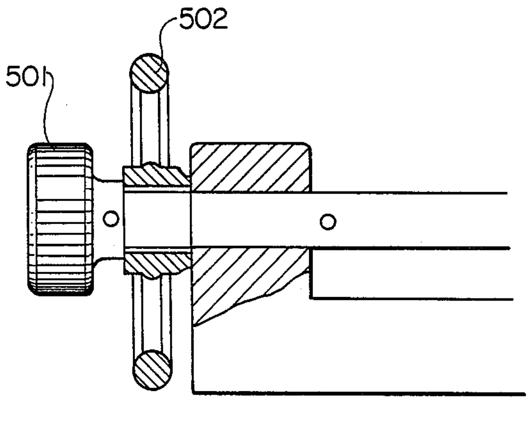
Figure 5B:
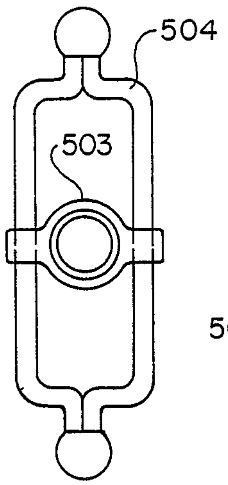
Figure 5C:
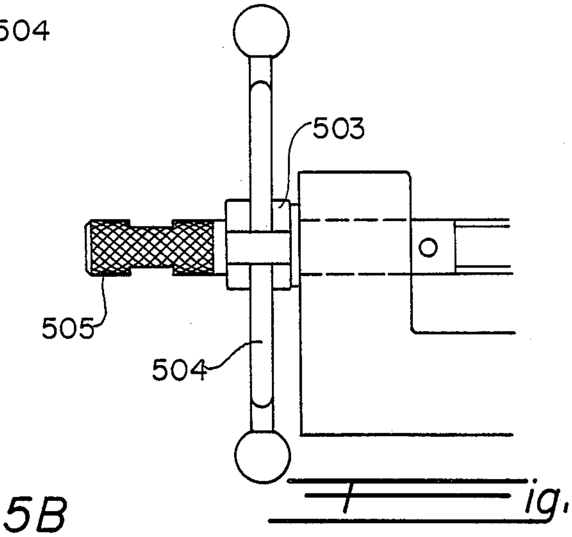

As for the driving method of a leading shaft and the second threaded grooves with a threaded cap of the above FIG. 3 and FIG. 4, it may be accomplished by the following formula:

(1) Each has an independent hand wheel as shown in the FIG. 5A and the FIG. 5B. In the FIG. 5A, 501 is a smaller hand wheel used to drive the above stated first threaded shaft. 502 is a larger hand wheel used to drive the above stated threaded cap on the second fine threaded grooves. The FIG. 5B shows that on the outer extending part of the threaded groove of a pressing head section of a threaded shaft, there is a knurled section (or multiple-sided shape) 505, FIG. 5C to be used for turning a threaded shaft by hand until it comes to a close pressing position. 503 is the second threaded groove with a threaded cap and has a vertical piercing hole for setting a handle 504 with both and closed which will be used to drive the threaded cap to make the stronger pressing power.

Figure 6:
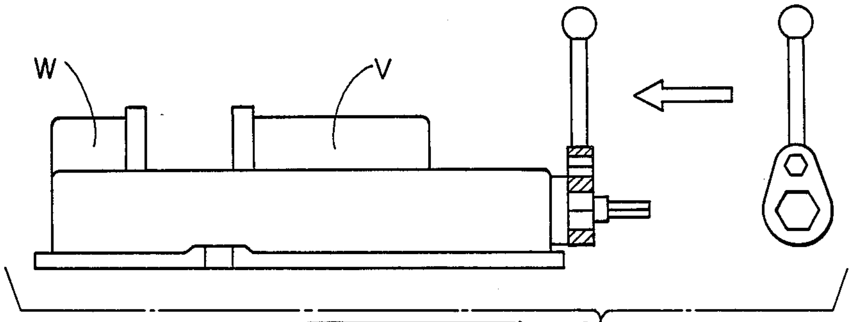
Figure 7:
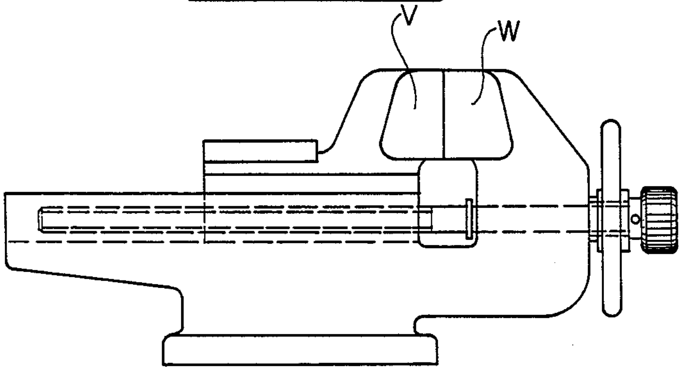
Figure 8:
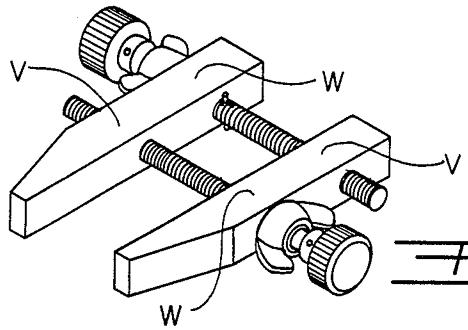
Figure 9:
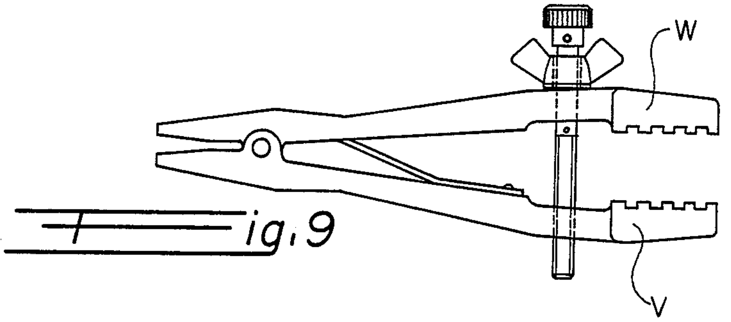
Figure 10:
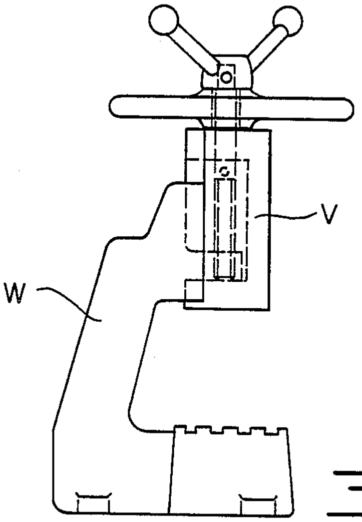

(2) By single sided sharing handle as shown in the FIG. 6.

The above-stated structure is put into other practical application such as for a plier or squeezing out equipment as shown in the FIGS. 7–10. Their driving speed and clamping pressure are more improved than the traditional ones.

I claim:

1. In a pressing apparatus which includes a fixed member, a movable member, a threaded shaft passing through the fixed and movable members for moving the movable member with respect to the fixed member for pressing an object between the fixed and movable members, and a handle for turning the threaded shaft, the improvement comprising:

a pressing head located on the threaded shaft, said pressing head having an outer diameter greater than the diameter of the threaded portion of the threaded shaft and said pressing head having external threads, said head threads being finer threads than the threads of the threaded shaft, a pressing cap having internal threads complementary with said external threads of said pressing head for engaging said head threads, whereby said pressing cap is capable of exerting stronger pressing power upon the object between the fixed and movable members after the threaded shaft has moved the movable member so that the object is pressed between the fixed and movable members, one end of the threaded shaft includes a relatively small bolt head formation for receiving one end of the handle, the outer surface of said pressing cap includes a fitting for a relatively large socket capable of being turned to exert the stronger pressing power after the threaded shaft has moved the movable member so that the object is pressed between the fixed and movable members, and the handle having a relatively small socket formed therein for being removably received on the bolt head formation of the threaded shaft and a relatively large socket formed therein for being removably received on the fitting of the pressing cap.

2. In a pressing apparatus which includes a fixed member, a movable member, a threaded shaft passing through the fixed and movable members for moving the movable member with respect to the fixed member for pressing an object between the fixed and movable members, and a handle for turning the threaded shaft, the improvement comprising:

a pressing head located on the threaded shaft, said pressing head having an outer diameter greater than the diameter of the threaded portion of the threaded shaft and said pressing head having external threads, said head threads being finer threads than the threads of the threaded shaft, a pressing cap having internal threads complementary with said external threads of said pressing head for engaging said head threads, whereby said pressing cap is capable of exerting stronger pressing power upon the object between the fixed and movable members after the threaded shaft has moved the movable member so that the object is pressed between the fixed and movable members, the movable member includes a nonthreaded opening through which a portion of the threaded shaft passes and in which the threaded shaft turns freely, and the fixed member includes a threaded hole whose threads engage the threads of the threaded shaft, whereby, by turning the threaded shaft in a predetermined tightening direction, the threaded shaft forces the movable member toward the fixed member until the movable member presses the object between the movable and fixed members, one end of the threaded shaft includes a relatively small bolt head formation for receiving one end of a two-ended handle, the outer surface of the pressing cap includes a fitting for a relatively large socket located on the other end of the handle, said socket capable of being turned to exert the stronger pressing power after the threaded shaft has moved the movable member to press the object between the fixed and movable members, further including loosening pin means for moving the movable member away from the fixed member when the threaded shaft is turned in a predetermined loosening direction, said loosening means being spaced from the fixed member thereby permitting said loosening means to move when the threaded shaft is tightly pressing said pressing cap.

* * * * *